United States Patent [19]
Schlosser et al.

[11] Patent Number: 6,155,248
[45] Date of Patent: Dec. 5, 2000

[54] ASH CATCHER ASSEMBLY FOR BARBECUE GRILL

[75] Inventors: Erich J. Schlosser, Barrington; J. Michael Alden, Palatine; Robert T. Stephen, Barrington, all of Ill.

[73] Assignee: Weber-Stephen Products Co., Palatine, Ill.

[21] Appl. No.: 09/372,367

[22] Filed: Aug. 11, 1999

[51] Int. Cl.[7] ....................................... F23J 1/00
[52] U.S. Cl. ........................................ 126/242; 126/25 R
[58] Field of Search ................................ 126/25 R, 9 R, 126/242–245, 41 R, 9 B

[56] References Cited

U.S. PATENT DOCUMENTS

| | | |
|---|---|---|
| Re. 33,091 | 10/1989 | Schlosser . |
| 101,177 | 3/1870 | Stevenson . |
| D. 351,308 | 10/1994 | Pai . |
| D. 352,865 | 11/1994 | Pai . |
| 1,055,311 | 3/1913 | Blount . |
| 2,530,166 | 11/1950 | Johannsen ............................. 126/25 R |
| 3,172,402 | 3/1965 | Valiela . |
| 3,209,743 | 10/1965 | Stewart et al. . |
| 3,279,452 | 10/1966 | Hottenroth et al. . |
| 3,474,725 | 10/1969 | McClaren . |
| 3,538,906 | 11/1970 | Heraty et al. . |
| 3,739,732 | 6/1973 | Graham . |
| 3,974,821 | 8/1976 | Storandt . |
| 4,416,248 | 11/1983 | Schlosser . |
| 4,567,876 | 2/1986 | Ogden . |
| 4,576,140 | 3/1986 | Schlosser . |
| 4,603,679 | 8/1986 | Ogden . |
| 4,741,322 | 5/1988 | Lin . |
| 4,763,640 | 8/1988 | Schnack et al. . |
| 4,773,319 | 9/1988 | Holland . |
| 4,823,684 | 4/1989 | Traeger et al. . |
| 4,850,333 | 7/1989 | Dellrud et al. . |
| 4,879,990 | 11/1989 | Clark . |
| 4,926,841 | 5/1990 | Woolf . |
| 5,016,607 | 5/1991 | Doolittle et al. . |
| 5,027,788 | 7/1991 | Schlosser et al. . |
| 5,036,832 | 8/1991 | Schlosser et al. . |
| 5,076,252 | 12/1991 | Schlosser et al. . |
| 5,097,817 | 3/1992 | Dodgen . |
| 5,174,272 | 12/1992 | Clark . |
| 5,299,553 | 4/1994 | Giebel et al. . |

FOREIGN PATENT DOCUMENTS 2417964  9/1979  France .

OTHER PUBLICATIONS

Arctic Product Information Sheet for Arctic Kettle Bar-B-Que Grill, Arctic Products, Jefferson City, Missouri.
Patio Classic Product Information Brochure, Porcelain Metals Corporation, Louisville, Kentucky.
Bao–Yi Trading, Inc. Product Information Sheet, So. San Francisco, California.
Vortex Product Information Sheet for 14–1/2" Tabletop BBQ Grills.

*Primary Examiner*—James C. Yeung
*Attorney, Agent, or Firm*—Wallenstein & Wagner, Ltd.

[57] ABSTRACT

An ash catcher assembly for catching and containing ash and debris that falls through openings in the bottom of a barbecue grill is disclosed. The ash catcher assembly includes a mounting member capable of being removably connected to the barbecue grill, and a basket secured adjacent a bottom of the mounting member. The mounting member has a body portion and at least two resilient connecting members. The resilient connecting members have a transverse tab adjacent an end thereof for interconnecting with the barbecue grill. Generally, the transverse tabs snap into mating openings of the barbecue grill for connecting the ash catcher assembly to the barbecue grill. The basket has an open top end, a closed bottom end, a side wall connecting the top end and the bottom end, and a cavity therein to hold the ash that falls from the kettle. Protrusions and a handle extending from the sidewall of the basket mate with corresponding components of the mating member for removably securing the basket to the mating member.

27 Claims, 3 Drawing Sheets

ASH CATCHER ASSEMBLY FOR BARBECUE GRILL

DESCRIPTION

1. Technical Field

The present invention relates generally to barbecue grills and, more particularly, to ash catching devices for grills that burn carbon-based fuels.

2. Background of the Invention

Barbecue grills are very widely used today. One popular type of barbecue grill is referred to as a kettle-type grill. A barbecue kettle may consist of a generally semi-spherical bottom bowl that has a circular opening with a cooking grid located slightly below the upper rim of the bowl. A generally semi-spherical top cover can be placed on the bottom bowl to enclose the barbecue kettle. The barbecue kettle is supported on a leg arrangement. This kettle configuration is a registered trademark of the Assignee of the present invention.

Presently, one of the most popular barbecue grills is marketed by the Assignee of the present invention. One type of these barbecue grills that has received very favorable acceptance by consumers is disclosed in U.S. Reissue Pat. No. 33,091, owned by the Assignee of the present invention, and is sold under the trademark ONE-TOUCH®.

Barbecue kettles that are designed for burning charcoal or some other carbon-based product as a fuel generally have a second or lower grid for supporting the charcoal below the cooking grid. Additionally, both the bottom bowl and top cover generally have vent openings. The vent openings provide the interior of the kettle grill with the necessary oxygen for combustion of the charcoal while the cover is located on the bottom bowl.

During operation, the charcoal on the second grid burns, turns to ash, and falls to the bottom of the bowl. Additionally, grease, cooking fat, pieces of the food being cooked, portions of hot coals and other things also might fall to the bottom of the bowl. A plurality of openings are commonly located at the bottom of the bowl to allow this material to be discharged out of the bowl. Often, these openings are also employed as the vent openings for allowing air into the kettle for combustion of the charcoal fuel. As the ash from the burned fuel falls from the second grid, however, it may accumulate in the bottom of the bowl. A successful apparatus for scraping and disposing of this ash and debris from the bottom of the kettle through the openings, and for controlling the air intake into the bottom of the kettle is disclosed in U.S. Pat. No. 4,416,248, also owned by the Assignee of the present invention.

It is an accepted practice to have a small curved plate or saucer spaced below the bottom of the kettle to catch the ash and debris that falls through the openings in the bottom bowl. However, if there is any breeze or if the kettle is nudged or moved, it is possible for some ash and debris to not fall onto the saucer or to fall off of the saucer. This can pose a problem and a fire hazard if there is a risk of fire to the surrounding environment. For example, individuals living in apartment complexes with wooden balconies, campers and picnickers are almost always concerned about ash and debris escaping into the atmosphere. Further, it is inescapable that uncollected ash is, unfortunately, extremely messy and dirty. It is, therefore, desirable to provide a means for containing and disposing of such ash.

One type of ash catcher assembly for a barbecue grill that is incorporated into barbecue grills is disclosed in U.S. Pat. No. 5,036,832, and is owned by the Assignee of the present invention. This assembly incorporates a mounting ring secured to the bottom of the barbecue kettle, a basket member mounted to the mounting ring, and a transverse mounting band. The mounting band comprises a main strip with an extension at each end thereof, and a central aperture therethrough. The respective extensions at the ends of the mounting band are inserted into cooperating slots in the mounting ring, thereby coupling the mounting band with the mounting ring. The transverse mounting band must be fairly rigid and strong so as to support the mounting ring and basket member. The mounting band is attached to the bottom of the kettle bowl adjacent the openings by a screw or other mounting means. Generally, a thumb screw is threaded through a bottom-most opening in the kettle bottom and is passed through the aperture in the mounting band. A female nut or other engaging mechanism cooperates with the thumb screw to tighten and secure the mounting band to the outer bottom of the kettle bowl. Unfortunately, this requires additional mounting components and hardware which may be difficult for consumers to assemble. Additionally, assembly and disassembly of this device requires additional manufacturing time to secure and/or remove the mounting ring from the bottom of the kettle grill. Further, if the mounting band is bent by abuse of the user, the assembly may become loose and difficult to reassemble into a tightened position.

Accordingly, there is a need for an effective and efficient means for mounting an ash catcher assembly on a barbecue grill.

SUMMARY OF THE INVENTION

The ash catcher of the present inventions provides for catching ash and debris falling out through the openings in the bottom of the barbecue kettle. The present assembly is extremely easy to assemble and connect to a barbecue grill. Further, the present assembly can be easily disassembled to clean and store.

According to one aspect of the present invention, the ash catcher assembly comprises a first member adapted for holding the fallen ash, and a second member for removably securing the assembly to the barbecue grill. The first member is generally a basket that has an open top end, a closed bottom end, a side wall between the top end and the bottom end, and a cavity therein to hold the ash. The second member, also referred to as a mounting member, has a body portion and at least two resilient connecting members. The resilient connecting members connect the mounting member to the barbecue grill.

According to another aspect of the present invention, the resilient connecting members are integral with the body portion of the mounting member. A height of the resilient connecting members is generally less than a height of the body portion of the mounting member. Further, the resilient connecting member are generally spaced equidistant about a perimeter of the mounting member for secure attachment of the ash catcher assembly to the barbecue grill. The resilient connecting members are also angled inwardly from the body portion of the mounting member in order to provide a springing or snapping effect to lock the mounting member to the barbecue grill.

According to another aspect of the present invention, the resilient connecting members have a transverse tab proximal and end of the resilient connecting members. Generally, the transverse tabs are substantially perpendicular to the resilient connecting members and extend radially away from the geometric center of the mounting member. The transverse tabs are adapted to engage mating openings of the barbecue grill.

According to another aspect of the present invention, the resilient connecting members are adapted to mate with either a leg coupling on the bottom of the kettle, or to a leg of the barbecue grill.

According to another aspect of the present invention, the assembly includes a handle connected to the basket for gripping and for interconnecting the basket to a mounting member. The basket has a contoured slot in its sidewall such that the handle may be removably connected to the basket by a locking means when the handle is seated in the contoured slot.

According to yet another aspect of the present invention, the mounting member further comprises a bayonet mounting slot on the body thereof. A portion of the handle of the basket mates with the bayonet mounting slot of the mounting member to removably secure the basket to the mounting member.

Accordingly, an ash catcher assembly made in accordance with the present invention provides an inexpensive, easily manufactured, and easily assembled device which eliminates the drawbacks of prior ash catcher assemblies.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

Figure 1:
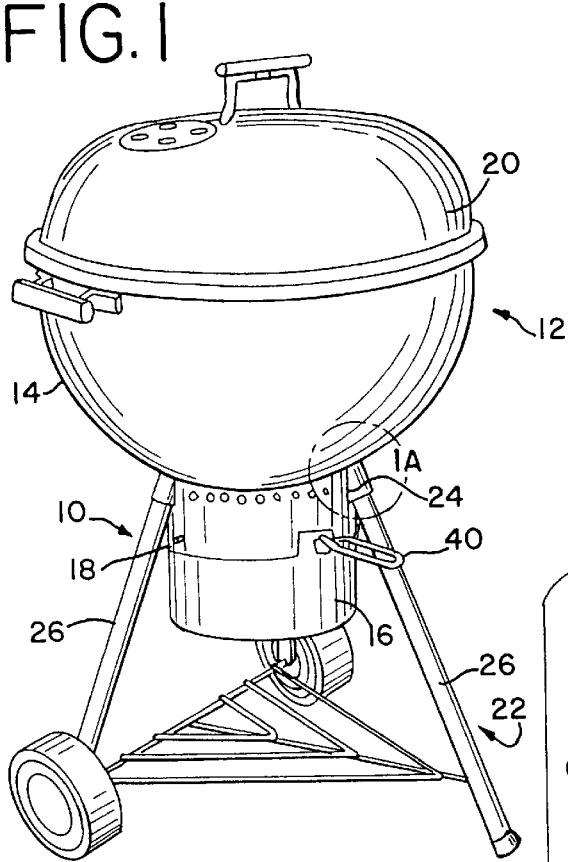
FIG. 1 is a perspective view of a barbecue grill having the ash catcher assembly of the present invention connected thereto.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
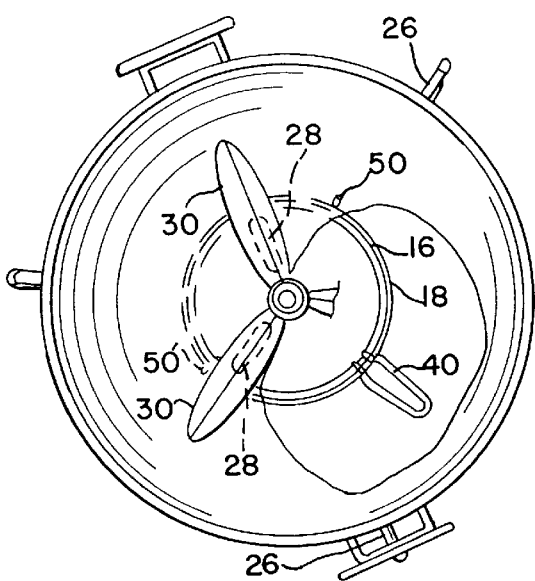
FIG. 2 is a partial cut-away top view of the kettle bottom of the barbecue grill of FIG. 1.
Figure 3:
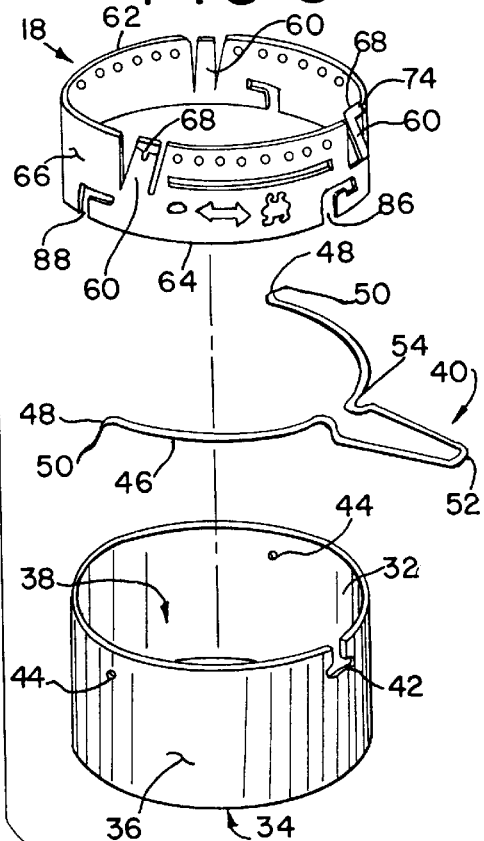
FIG. 3 is an exploded perspective view of the ash catcher assembly of the present invention.

Referring now in detail to the Figures, and initially to FIGS. 1–3, there is shown an ash catcher assembly 10 removably mounted to an outdoor cooking apparatus 12, preferably a barbecue grill 12, for catching ash and debris falling out through the openings in the bottom kettle 14 of the barbecue grill 12. The ash catcher assembly 10 has a first member 16 which is adapted to hold the fallen ash, and a second member 18 which secures the assembly 10 to the barbecue grill 12.

The barbecue grill 12 illustrated in FIG. 1 is generally constructed in accordance with the teachings of U.S. Pat. No. 4,416,248, assigned to Weber-Stephen Products Co. As such, the grill 12 comprises a bottom bowl cooking chamber or kettle 14, a removable cover 20, and a supporting frame or leg arrangement 22 for supporting the grill 12. The leg coupling 24 for securing the legs 26 of the grill 12 will be described in detail further herein, and is illustrated in FIGS. 5A–5C and 6. The cooking chamber 14 may have a plurality of mating receivers positioned on a bottom surface of the cooking chamber.

A lower grate (not shown) is place within the kettle 14 and spaced a short distance above the bottom of the kettle to hold the solid carbon-based fuel (such as charcoal briquettes), which are burned in the barbecuing process. The ash may be created from other carbon-based items, such as paper, from a paper-start device. Spaced above the lower grate and below the kettle's 14 upper rim there is a cooking grid (not shown) on which the food being cooked is placed.

During the cooking process the fuel within the kettle 14 burns and turns to ash which can, if left alone, collect on the bottom of the kettle 14, with a portion of the ash draining through one of the plurality of openings 28 of the kettle 14 as shown in FIG. 2. A significant and highly successful system of removing the ashes is disclosed in U.S. Reissue Pat. No. 33,091, entitled "Ash Disposal Damper For Barbecue Kettle," and assigned to the Assignee of the present invention. Generally, there are three openings 28 in the bottom of the kettle bowl 14. The arms 30 of the ash disposal system rotate and scrape the bottom of the kettle bowl 14 of the fallen ash and debris. The scraped material thereafter falls through the openings 28 and into the ash catcher 10 which is attached to the barbecue grill 12.

As illustrated in FIGS. 1 and 3, the first member or basket 16 is shaped like a pot or bowl for catching and containing the fallen ash and debris. The basket 16 has an open top end 32, a closed bottom end 34, a side wall 36 connecting the top end 32 and the bottom end 34, and a cavity 38 therein to hold the ash that falls from the kettle 14. A handle 40 protrudes from an exterior of the sidewall 36 of the basket 16 for grasping the basket 16. In the preferred embodiment, the basket 16 is constructed of an aluminum material of approximately 1/16" thickness. The basket 16 additionally has a first mating member 50 that mates with a second mating member 52 of the second member 18 of the ash catcher assembly 10.

In the embodiment illustrated in FIG. 3, a contoured slot 42 in the shape of an inverted "T" (i.e., a narrow vertical section leading downward toward a wider horizontal section) extends downward from the top end 32 of the basket for containing the handle 40 of the ash catcher 10. Further, two apertures 44 extend through the side wall 36 of the basket 16 adjacent the top end 32 thereof for additional securement of the handle member 40.

The two apertures 44 and contoured slot 42 are specifically utilized for containing a handle 40 of the ash catcher assembly 10 when the handle 40 is made of a bent-up wire configuration. As shown in FIG. 3, one form of the handle member 40 comprises a wire of sufficient diameter such that it is rigid when formed to the desired shape. The configuration of the wire handle 40 includes a semi-circular portion 46 with an outwardly extending free end 48 at each end for engaging the apertures 44 in the side wall 36 of the basket 16. In this embodiment, the outwardly extending free ends 48 are able to pass through the apertures 44 in the side wall 36 of the basket 16 and form the first mating members 50 for mating with the second mating members 51 of the second member 18. As will be explained further herein, the connection of the first mating members 50 with the second mating members 51 provides for partially connecting the basket member 16 to the second member 18. The handle 40 further has an elliptical hoop portion 52 for gripping the handle 40 by the grill operator. Two opposed inwardly-bent sections 54 connect the elliptical hoop portion 52 with the semi-circular portion 46 to complete the handle member 40. The two opposed inwardly-bent sections 54 cooperate with and engage the basket 40 at the contoured slot 42 section thereof.

As such, the handle member 40 is attached to the basket 16 by first inserting each outwardly extending free end 48 through the respective apertures 44 while maintaining the semi-circular portion 46 spaced above the basket 16. The semi-circular portion 46 is then pinched slightly, generally by squeezing the elliptical hoop portion 52, so as to push the opposed inwardly-bent sections 54 towards each other. When the opposed inwardly-bent sections 54 are sufficiently pushed toward each other, they can then be guided into the "T" slot 42 in the basket. Once the opposed inwardly-bent sections reach the wider bottom portion of the "T" slot 42 they can be released by removal of the squeezing pressure on the elliptical hoop portion 52. Upon release, the opposed inwardly-bent sections 54 will expand in a direction away from each other and frictionally engage the contoured slot 42. This forms the locking means for seating the handle 40 in the contoured slot 42. Consequently, the handle member 40 is secured to the basket 16. When properly secured to the basket 16, the handle member 40 is connected to the basket 16 at three points. At the first two points the outwardly-extending free ends 48 extend through the apertures 44 in the side wall 36 of the basket 16. It is important that the outwardly-extending free ends 48 further extend past the side wall 36 in order to form the first mating members 50 for mating with the second mating members 51 of the second member 18. The third connection point is the where the opposed inwardly-bent section 54 is securely seated in the contoured slot 42, such that the elliptical hoop portion 52 can be grasped by the operator.

It should be appreciated that the handle member need not be a separate member from the basket. A handle can be permanently attached, such as by welding, or made an integral part of the basket. However, having a detachable handle permits one to ship and store the entire assembly in a smaller space, and also facilitates cleaning of the assembly. Further, with an attached handle, separate first mating members 50 would be required to be placed on the side wall 36 of the basket 16.

The second member 18 of the ash catcher assembly 10 is also referred to as the mounting member 18, and is best illustrated in FIGS. 3 and 4A–4C. The mounting member 18 is adapted to be removably connected to the barbecue grill 12 with the use of resilient connecting members 60. In the embodiment illustrated, the mounting member 18 is generally shaped in the form of a ring, however, other geometric configurations may be utilized as well. The mounting member 18 has a first end 62 at the top of the mounting member 18, a second end 64 at the bottom of the mounting member 18. When attached to the barbecue grill 12 with the rest of the ash catcher assembly 10, the first end 62 of the mounting member 18 is adjacent the bottom of the kettle, and the second end 64 of the mounting member 18 is adjacent the basket 16. The mounting member 18 further has a body portion or side wall 66. When configured in the shape of a ring, the body portion 66 of the mounting member 18 is substantially circular in shape.

Figure 4A:
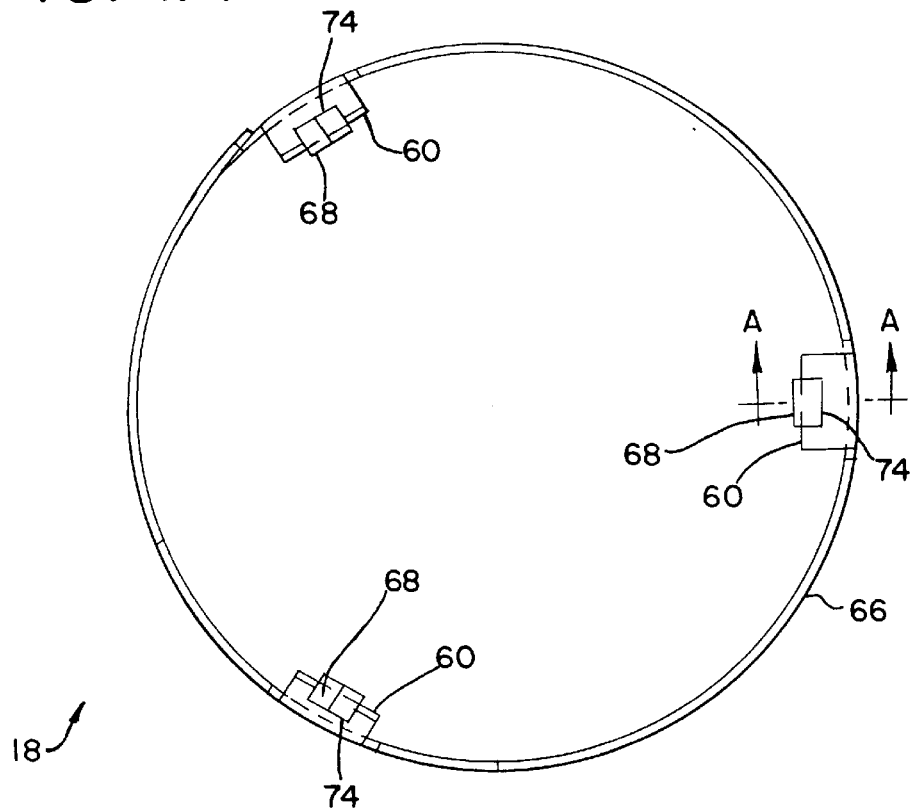
FIG. 4A is a top plan view of the mounting member of the ash catcher assembly of the present invention.
Figure 4B:
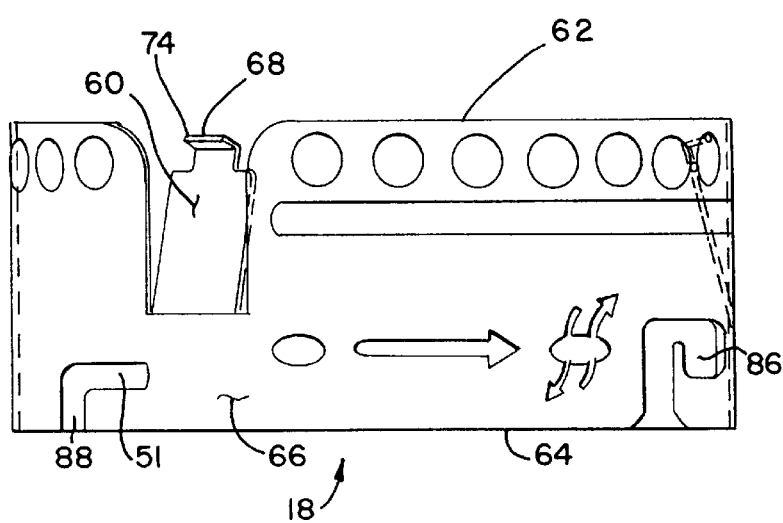
FIG. 4B is a front elevation view of the mounting member of the ash catcher assembly of the present invention.
Figure 4C:
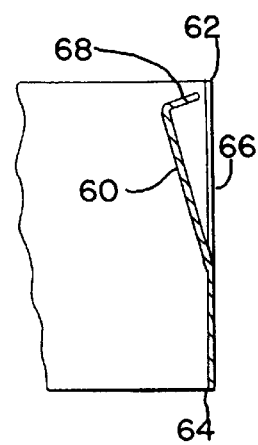
FIG. 4C is a partial cross-sectional elevation view taken along line C—C of FIG. 4B.
Figure 5A:
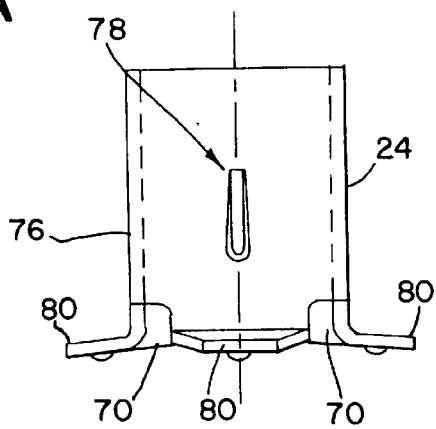
FIG. 5A is a front elevation view of the leg coupling of the present invention.
Figure 5B:
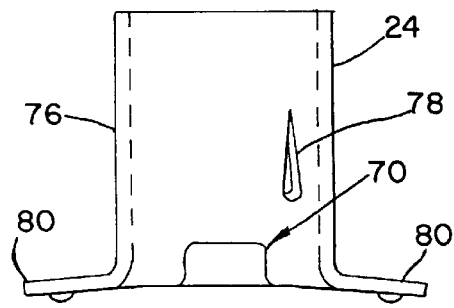
FIG. 5B is a side elevation view of the leg coupling of the present invention.
Figure 5C:
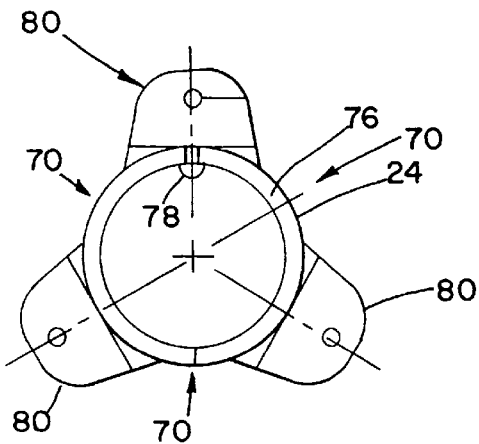
FIG. 5C is a top view of the leg coupling of the present invention.

The resilient connecting members 60 illustrated in FIGS. 4A–4C are generally formed from, and thus integral with the body portion 66 of the mounting member 18. FIG. 4B shows that the height of the resilient connecting members 60 is less than the overall height of the body portion 66 of the mounting member 18. In one preferred embodiment, the overall height of the body portion 66 of the mounting member 18 is approximately 3.5", and the height of the resilient connecting member is slightly less than 2". Further, the resilient connecting members 60 generally angled to extend angularly away from, or more specifically, inwardly from, the body portion 66 of the mounting member 18. Generally, the angle between the resilient connecting member 60 and the body portion 66 of the mounting member 18 is preferably approximately between 10° and 20°. This angle allows for the appropriate mating or snapping securing features of the mounting member 18 as will be described further herein.

In the preferred embodiment the mounting member 18 has at least three resilient connecting members 60 spaced equidistant about the perimeter of the mounting member 18. Having three resilient connecting members 60 provides that the ash catcher assembly 10 is securely connected to the barbecue grill 12 such that the assembly will not rattle or become dislodged, especially when moving or transporting the barbecue grill 12. Further, it its preferable for the mounting member 18 to have connecting members 60 in generally opposed relation around the outer circumference of the mounting members 18.

Also illustrated in FIGS. 4A–4C, the resilient connecting members 60 have a transverse tab or projection 68 proximal an end of the connecting members 60 for interconnecting with the barbecue grill 12. The transverse tabs 68 are integral with and formed from the end of the respective resilient connecting members 60. As best viewed in FIG. 4C, the transverse tabs 68 extend substantially perpendicular from the resilient connecting member 60. In the preferred embodiment, the transverse tabs 68 extend at an angle from the resilient connecting member of between 80° and 100°. Additionally, as shown in FIG. 4B, the transverse tabs 68 extend generally radially away from an overall center of the mounting member 18 such that the tabs 68, being connected to members 60 that are angled away from the body 66 of the mounting member 18 and toward the center of the mounting member 18, extend generally back toward the body portion 66 of the mounting member 18. The transverse tabs 68 are adapted to be received into mating openings of the barbecue grill 12 for removably securing or connecting the mounting member 18, and ultimately the entire ash catcher assembly 10, to the barbecue grill 12. The transverse tabs 68 are able to accomplish this feature because the resilient connecting members 60 act as a form of a spring.

Figure 1A:
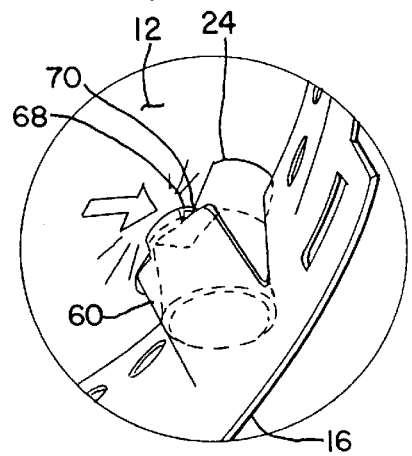
FIG. 1A is a partial exploded view of the ash catcher of the present invention mating with the barbecue grill.

When connecting the mounting member 18 to the barbecue grill, the transverse tabs 68 are lined up in spaced relationship to the mating openings 70 on the barbecue grill 12. In the preferred embodiment the mating openings 70 are formed by the leg coupling 24 in combination with the bottom kettle 14 of the barbecue grill 12, and are described in greater detail below and as shown in FIG. 1A. Generally, the three ends 74 of the tabs 68 form an imaginary diameter.

This diameter is generally greater than the diameter formed by the openings 70 in the leg couplings 24. Accordingly, in order to place the tabs 68 into the openings 70, the resilient connecting members 60 must be displaced back away from the body portion 66 of the mounting member 18 toward the center of the mounting member in a first position. This is capable since, as explained above, the resilient connecting members 60 have a springing capability and are able to be displaced slightly, but still return to their original form. Accordingly, once the resilient connecting members 60 are displaced in the first described position, the tabs 68 can be inserted into the openings 70. The resilient connecting members 60, wanting to regain their original configuration, then push the tabs 68 into the openings 70 and provide a pressure or force to maintain the tabs 68 in the openings, thus maintaining the resilient connecting members 60 in a second position. The tabs 68 can only be removed from the mating openings 70 if a counter force is re-applied to the resilient connecting members 60, forcing the resilient connecting members 60 backward again such that the tabs 68 become removed from the mating openings 70.

As shown in FIGS. 5A–5C and 6, the leg coupling 24 is a support for the legs 26 of the barbecue grill 12. The leg coupling 24 comprises a generally tubular member 76 which is sized to receive the upper end 84 of a leg 26, a detent 78 projecting from the tubular member 76 to the interior thereof to engage an inserted leg member 26, and a plurality of spaced basal flanges 80. A portion of the wall of the tubular member 76 is removed adjacent and between the basal flanges 80 to provide the opening 70 that mates with the transverse tabs 68 of the resilient connecting members 60. It is important that the leg coupling 24 is located and fixed appropriately on the kettle bottom 14 such that the opening 70 is aligned with a mating tab 68 for securement of the mounting member 18.

Figure 6:
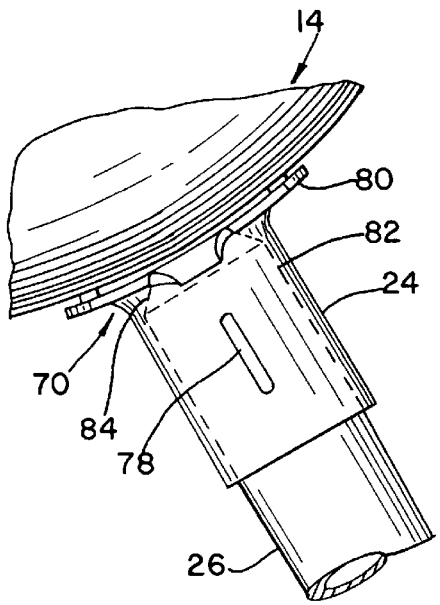
FIG. 6 is a partial elevational view of the leg mating with the leg coupling of the present invention.

As shown in FIG. 6, the proximal end 82 of the leg 26 has been modified from prior barbecue grill legs. Specifically, the proximal end 82 of the leg 26 has been manufactured to provide a chamfer 84 thereat. The chamfer 84 has been found to resolve several drawbacks of prior grill legs. First, the chamfer 84 provides an end diameter and surface area which mates better with the kettle bottom 14. Without the chamfer 84, the larger diameter at the end of the leg did not mate extremely well with the radius of curvature of the kettle bottom 14, thereby causing a marring of both the leg end and the kettle bottom. Second, by extruding or turning in the end of the leg 26, a stronger end is created due to the additional bend of the material. Finally, the chamfered end 84 provides the end of the leg 26 with a smaller outer diameter to confer clearance for the tab 68 that is inserted into the opening 70 therefor.

It should be understood that the resilient connecting member and transverse tab is capable of mating with any sufficient mating opening. In the preferred embodiment the opening is provided by the leg coupling on the bottom of the kettle. Depending on the geometric relationship of the components, however, the opening may be provided in the kettle bottom, or in the legs of the barbecue grill.

Further, the components containing the mating tabs 68 and openings 70 may be reversed. As such, instead of the resilient connecting member 60 having a tab 68, the resilient connecting member 60 has an opening 70 therein. And, the opening 70 of the resilient connecting member 60 is adapted to mate with a protrusion 68 on the barbecue grill 12 for connecting the mounting member 18 to the barbecue grill 12. In such a configuration, the resilient connecting members 60 may be adapted to be connected to a protrusion 68 on the leg coupling 24 on the kettle bottom 14.

As illustrated in FIGS. 4A–4C, the mounting member 18 preferably has a bayonet mounting slot 86 at a first location on the body portion 66 of the mounting member 18. The bayonet mounting slot 86 is capable of mating with the bayonet mounting member formed by the handle 40 to removably secure the basket 16 to the mounting member 18. Additionally, the mounting member 18 has a first aperture 88 at a second location thereof, and a second aperture 90 at a third location thereof through the body portion 66 of the mounting member 18. As shown in FIG. 4B, the first and second apertures 88,90 are in the shape of a "L." The apertures 88,90 form the second mating member 51 on the mounting member 18 and mate with the first mating member or protrusion 50 of the basket 16 to removably secure the basket 16 to the mounting member 18. In the preferred embodiment, the free ends 48 form the first mating members 50 which engage the slots 88,90 of the mounting member. As such, the basket 16 is raised to the mounting member 18 such that the first mating members 50 engage the second mating members 51, and the handle 40 engages the bayonet mounting slot 86. The basket is then rotated and the bayonet mounting means of the handle 16 is secured in the bayonet mounting slot of the mounting member 18. As such, the basket or first member 16 is capable of being removably secured adjacent a bottom of the second member 18. Further, the basket 16 may be secured to the mounting member 18 by other arrangements. For example, the basket 16 may be dimensioned to slide into a slot or other opening in the mounting member 18 to gravitationally suspend the basket 16.

While the specific embodiments have been illustrated and described, numerous modifications come to mind without significantly departing from the spirit of the invention, and the scope of protection is only limited by the scope of the accompanying Claims.

We claim:

1. An ash catcher assembly for removably mounting to an outdoor cooking device, the outdoor cooking device having a bottom portion with at least one opening for permitting ash to fall therethrough, comprising:
   a first member adapted for holding the fallen ash; and,
   a second member having at least two resilient connecting members adapted to removably connect the second member to the outdoor cooking device, the resilient connecting members being capable of moving from a first position to a second position, and wherein the first member is capable of being removably secured adjacent a bottom of the second member.

2. The ash catcher assembly of claim 1, wherein the at least two resilient connecting member have a transverse tab proximal an end thereof for interconnecting with the outdoor cooking device.

3. The ash catcher assembly of claim 2, wherein the transverse tabs are adapted to engage with mating openings of the barbecue grill for connecting the second member to the outdoor cooking device.

4. The ash catcher assembly of claim 2, wherein the transverse tabs extend generally radially away from a center of the second member.

5. The ash catcher assembly of claim 2, wherein the transverse tab extend substantially perpendicularly from the resilient connecting member.

6. The ash catcher assembly of claim 1, wherein the resilient connecting members are integral with the second member.

7. The ash catcher assembly of claim 1, wherein the resilient connecting members are generally evenly spaced about a perimeter of the second member.

8. The ash catcher assembly of claim 1, wherein the second member has a body portion integral with the resilient connecting members, and wherein the resilient connecting members are angled inwardly from the body portion of the second member.

9. The ash catcher assembly of claim 1, wherein the resilient connecting members are adapted to be connected to a leg coupling on the outdoor cooking device.

10. The ash catcher assembly of claim 9, wherein the resilient connecting member has a transverse tab adapted to mate with an opening in the leg coupling on the bottom of the kettle for removably connecting the second member to the outdoor cooking device.

11. The ash catcher assembly of claim 1, wherein the resilient connecting member is adapted to be connected to the bottom portion of the outdoor cooking device.

12. The ash catcher assembly of claim 1, wherein the resilient connecting member is adapted to be connected to a leg of the outdoor cooking device.

13. An ash catcher assembly for a barbecue grill, the barbecue grill having a kettle bottom and a top cover therefor, the kettle having at least one opening in its bottom for permitting ash to fall therethrough into the ash catcher assembly, comprising:
   a basket having an open top end and a closed bottom end, and being adapted to hold the ash that falls from the kettle; and,
   a mounting member adjacent the kettle and having a body portion and at least two resilient connecting members having a transverse tab adjacent an end thereof, the transverse tabs adapted to removably secure the mounting member to the barbecue grill, and wherein the basket has a first mating member that mates with a second mating member on the mounting member for removably connecting the basket to the mounting member.

14. The ash catcher assembly of claim 13, wherein the resilient connecting members and transverse tabs are integral with and partially formed from the body portion of the mounting member.

15. The ash catcher assembly of claim 14, wherein the resilient connecting members are adapted to be connected to leg couplings on the kettle bottom.

16. The ash catcher assembly of claim 14, wherein a height of the resilient connecting members is less than a height of the body portion of the mounting member.

17. The ash catcher assembly of claim 13, wherein the resilient connecting members are adapted to be connected to legs of the barbecue grill.

18. The ash catcher assembly of claim 13, wherein the basket has a handle protruding from an exterior thereof for grasping the basket.

19. The ash catcher of claim 18, wherein the basket has a contoured slot and wherein the handle is removably connected to the basket by a locking means when seated in the contoured slot.

20. The ash catcher assembly of claim 18, wherein the mounting member further comprises a bayonet mounting slot on the body thereof, wherein a portion of the handle of the basket forms a bayonet mounting member, and wherein the bayonet mounting member of the handle mates with the bayonet mounting slot of the mounting member to removably secure the basket to the mounting member.

21. The ash catcher assembly of claim 13, wherein the second mating member on the mounting member further comprises a slot, wherein the first mating member of the basket further comprises a protrusion, and wherein the protrusion of the basket mates with the slot on the mounting member to removably secure the basket to the mounting member.

22. The ash catcher assembly of claim 13, wherein the transverse tabs extend generally away from a geometric center of the mounting member.

23. The ash catcher assembly of claim 13, wherein the body portion of the mounting member is substantially circular in shape.

24. An ash catcher assembly for a barbecue grill, the barbecue grill having a kettle bottom and a top cover therefor, the kettle having at least one opening in its bottom for permitting ash to fall therethrough into the ash catcher assembly, comprising:
   a basket having an open top end, a closed bottom end, a side wall connecting the top end and the bottom end, and a cavity therein to hold the ash that falls from the kettle; and,
   a mounting member having a first end and a second end, the first end being adjacent the bottom of the kettle and the second end being adjacent the basket, the mounting member further having a body portion and at least two resilient connecting members, at least two of the resilient connecting members being integral with and extending angularly from the body portion of the mounting member, and at least two of the resilient connecting members having a transverse tab adjacent an end thereof, the transverse tabs extending generally away from a center of the mounting member, and the transverse tabs being capable of mating with the kettle bottom for removably securing the mounting member to the barbecue grill.

25. The ash catcher of claim 24, wherein the mounting member has a bayonet mounting slot at a first location of the body portion thereof, a first aperture through the body portion at a second location thereof, and a second aperture through the body portion a third location thereof, wherein the basket has a first protrusion on the side wall capable of mating with the first aperture on the mounting member, and a second protrusion on the side wall capable of mating with the second aperture on the mounting member, and a handle extending from the sidewall, wherein the handle of the basket is capable of mating with the bayonet mounting slot of the mounting member, and wherein the handle and the first and second protrusions are utilized to removably securing the basket to the mounting member.

26. An ash catcher for a barbecue grill comprising:
   a cooking chamber supported on a frame and having a plurality of mating receivers positioned on a bottom surface of the cooking chamber, the cooking chamber having an opening for permitting ash to fall therethrough; and
   an auxiliary chamber being removably secured to the bottom of the cooking chamber for holding fallen ash, the auxiliary chamber having a side wall with a plurality of integral connecting members, the connecting members being adapted to be manipulated between a first position radially from the side wall and a second position radially outward of the first position, wherein the connecting members have a projection adapted to mate with the mating receiver when the connecting member is in the first position.

27. The ash catcher of claim 26, further comprising a separate chamber connected to the auxiliary chamber, the separate chamber retaining ash that falls from the cooking chamber.

* * * * *